(12) United States Patent
Nassouri et al.

(10) Patent No.: US 8,577,565 B2
(45) Date of Patent: Nov. 5, 2013

(54) LIMITING BRANCH PRESSURE TO A SOLENOID VALVE IN A FLUID CIRCUIT

(75) Inventors: Crystal Nassouri, West Bloomfield, MI (US); Steven P. Moorman, Dexter, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 13/328,537

(22) Filed: Dec. 16, 2011

(65) Prior Publication Data

US 2013/0158824 A1 Jun. 20, 2013

(51) Int. Cl.
*G06F 17/00* (2006.01)
(52) U.S. Cl.
USPC ............................................................ 701/51
(58) Field of Classification Search
USPC ........................................ 701/51, 58, 67, 68
See application file for complete search history.

(56) References Cited

U.S. PATENT DOCUMENTS 5,458,540 A * 10/1995 Moan et al. ...................... 474/28
2004/0219079 A1* 11/2004 Hagen et al. ................... 422/194

* cited by examiner

*Primary Examiner* — Kim T Nguyen
(74) *Attorney, Agent, or Firm* — Quinn Law Group, PLLC

(57) ABSTRACT

A vehicle includes a clutch, pump, pressure control variable force solenoid (PVFS) valve in a branch supplying oil from the pump to the clutch through a flow control VFS (QVFS), and a controller. The controller calculates an area of a variable orifice of the QVFS valve at the start of a clutch shift, records the area as a maximum area, and calculates a maximum branch pressure as a function of the area. The controller limits pressure in the branch during the shift event to the calculated maximum branch pressure. The transmission may be a dual-clutch transmission (DCT) with the clutch being a DCT input clutch. A control system includes a host machine, temperature and pressure sensors, a computer-readable medium with instructions for limiting branch pressure as a function of the maximum area noted above and using sensor values from the sensors. A method of limiting branch pressure is also disclosed.

16 Claims, 2 Drawing Sheets

US 8,577,565 B2

LIMITING BRANCH PRESSURE TO A SOLENOID VALVE IN A FLUID CIRCUIT

TECHNICAL FIELD

The present disclosure relates generally to a system and method for limiting branch pressure to a variable force solenoid valve in a fluid circuit.

BACKGROUND

Hydraulic fluid circuits employ various fluid powered components such as valves and pistons to perform useful work in a system. Fluid pressure within the fluid circuit is typically provided via a fixed or variable displacement pump, with supplemental fluid pressure provided as needed by a hydraulic accumulator. When the pump is running, fluid is delivered under pressure to all open branches of the fluid circuit. In a system having a clutch, the clutch may be controlled via one or more variable force solenoid valves. In a dual-clutch transmission having two input clutches, different variable force solenoids may be positioned in parallel to control the pressurization and fill of the different input clutches.

SUMMARY

A vehicle is disclosed herein having a fluid circuit that includes a pump, pressure control variable force solenoid (PVFS) valve, flow control variable force solenoid (QVFS), a clutch, and a controller in electrical communication with the pump, the PVFS valve, and the clutch. The pump provides fluid pressure to the PVFS valve, which in turn supplies pressure to the QVFS valve. The QVFS valve directs pressurized oil to the clutch. In the event of failure of the QVFS valve to a feeding position, branch pressure on the clutch, particularly an on-coming clutch in a particular shift event, may be high enough to temporarily increase clutch pressure. This pressure spike can affect shift feel, and if the spike is severe enough, the clutch hardware itself may be affected. The controller is therefore programmed or otherwise configured to calculate an optimal branch pressure to the PVFS valve based on a worst-case/maximum aperture area required by the QVFS valve, and enforcing that branch pressure as a hard limit during the shift event.

In particular, a vehicle is disclosed herein that includes a transmission having a clutch, a pump in fluid communication with the clutch, a PVFS valve, a QVFS valve, and a controller. The QVFS valve delivers fluid through a variable orifice to the clutch. The controller calculates the area of the variable orifice at the start of a clutch shift event, records the calculated area as a maximum area, and calculates a maximum branch pressure to the PVFS valve as a function of the maximum area. The controller also controls the clutch through the shift event using the calculated maximum branch pressure.

A control system is also disclosed that includes a host machine in electrical communication with the clutch, pump, and the QVFS and PVFS valves noted above, as well as pressure and temperature sensors. The pressure sensor is positioned in the line pressure circuit which feeds the PFVS valve in electrical communication with the host machine. The pressure sensor measures an actual line pressure feeding the PVFS which feeds the branch. The temperature sensor is positioned in the fluid circuit in electrical communication with the host machine and measures a temperature of the oil. The host machine includes a tangible, non-transitory computer-readable medium on which is recorded instructions for limiting branch pressure.

Execution of the instructions causes the host machine, or a processor thereof, to calculate an area of a variable orifice of the QVFS valve at the start of a clutch shift event as a function of the commanded branch pressure and measured oil temperature, and to record the calculated area as a maximum area. The host also calculates, in a calibrated loop throughout the shift event, a maximum allowable branch pressure in the branch as a function of the calculated maximum area. Actual branch pressure is limited to the calculated maximum allowable branch pressure throughout the shift event.

A method includes calculating an area of a variable orifice of a QVFS valve at the start of a clutch shift event in a vehicle, wherein the vehicle includes a pump that is in fluid communication with a clutch through the PVFS valve and the QVFS valve in a branch of a fluid circuit. The method further includes recording the calculated area as a maximum area, and calculating, in a calibrated loop throughout the shift event, a maximum branch pressure in the branch as a function of the calculated maximum area. Additionally, the method includes limiting fluid pressure in the branch throughout the shift event to the calculated maximum branch pressure.

The above features and advantages and other features and advantages of the present invention are readily apparent from the following detailed description of the best modes for carrying out the invention when taken in connection with the accompanying drawings.

DETAILED DESCRIPTION

Figure 1:
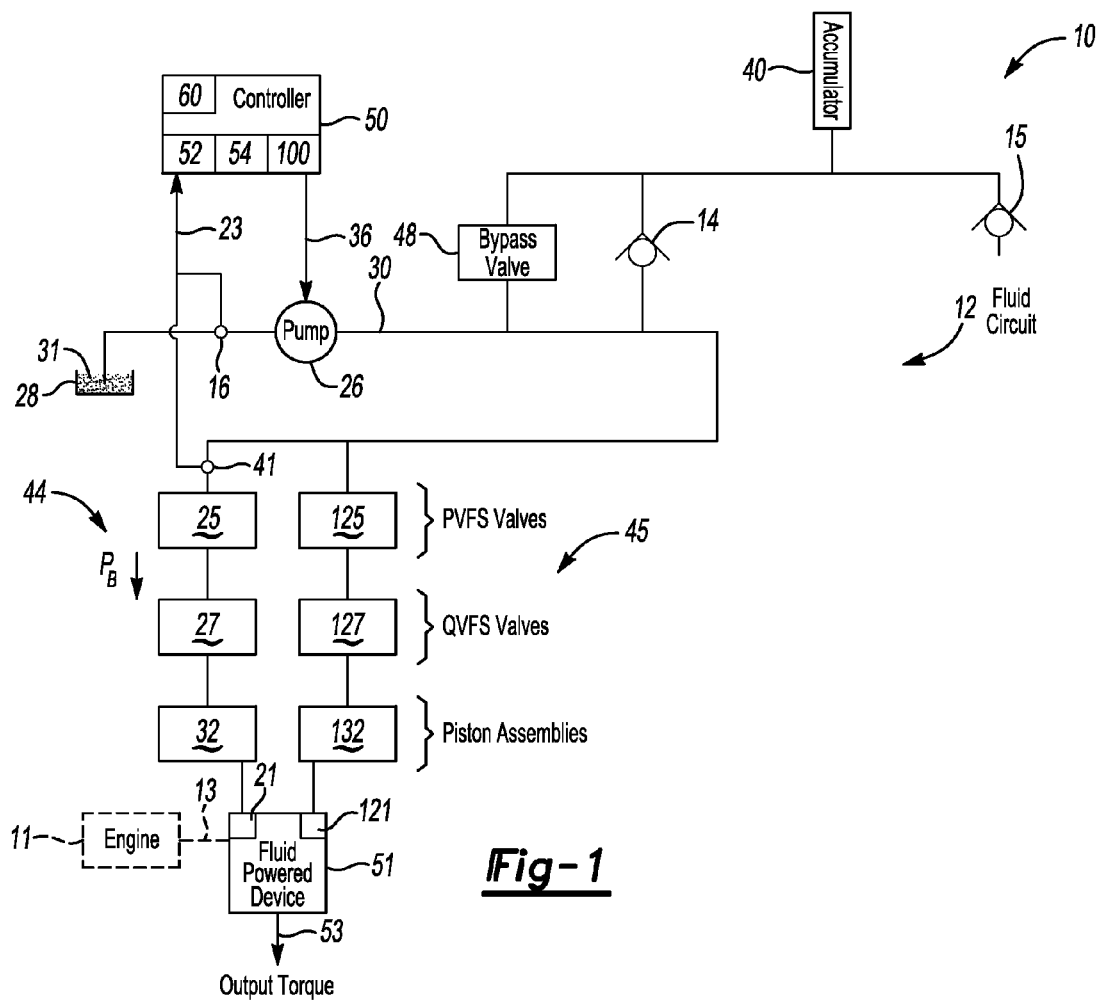
FIG. 1 is a schematic illustration of an example system in the form of a vehicle, with the vehicle having a hydraulic fluid circuit and a controller which selectively limits branch pressure to a flow control variable force solenoid (QVFS) valve in the fluid circuit.

Referring to the drawings, wherein like reference numbers correspond to like or similar components throughout the several figures, an example system 10 is shown in FIG. 1. The system 10 may be a vehicle having a fluid powered device 51 in the embodiment shown in FIG. 1, e.g., a transmission having a clutch 21 and/or 121. Other possible systems may include a plant floor which circulates fluid under pressure to operate such example devices 51 as hydraulic presses, conveyors, and lifts.

The system 10 includes at least a pump 26 and a fluid circuit 12 formed from various pipes, hoses, and fittings, collectively referred to as fluid conduit 30, for circulating fluid 31 from the pump 26 to the device 51. A temperature sensor 16 may be positioned in the fluid circuit 12 in electrical communication with a controller 50, with measured fluid temperature transmitted to the controller 50 as part of the control signals (arrow 23). Likewise, a pressure sensor 41 may be positioned in the branch 44 in electrical communication with the controller 50. Sensor 41 is configured to measure the actual line pressure and relay this value to the controller 50 as part of the control signals (arrow 23).

The system 10 further includes at least one pressure control variable force solenoid (PVFS) valve 25 in fluid communication with the pump 26. Two PVFS valves 25 and 125 are shown in FIG. 1 to illustrate that the present approach may be simultaneously applied to multiple branches 44 and 45 in the fluid circuit 12. More or fewer branches and VFS valves may be used depending on the configuration of system 10.

The system 10 further includes at least one flow control variable force solenoid (QVFS) valve 27 in fluid communication with the PVFS valve 25 and clutch actuator 32. Two QVFS valves 27 and 127 are shown in FIG. 1 to illustrate that the present approach may simultaneously applied to multiple branches 44 and 45 in the fluid circuit 12. More or fewer branches and QVFS valves may be used depending on the configuration of the system 10.

A controller 50 stores and accesses process instructions embodying the present method 100. The controller 50 may be embodied as a host machine including elements such as a processor/CPU 52, memory 54 including but not limited to read only memory (ROM), random access memory (RAM), electrically-programmable read-only memory (EPROM), flash memory, etc., and circuitry including but not limited to a high-speed clock (not shown), analog-to-digital (A/D) circuitry, digital-to-analog (D/A) circuitry, a digital signal processor (DSP), and the necessary input/output (I/O) devices and other signal conditioning and/or buffer circuitry. In conjunction with various sensors, e.g., a temperature sensor 16 and a pressure sensor 41, the controller 50 may be used as part of an overall control system.

One or more lookup tables 60 may be used to store various values as explained below with reference to FIG. 2, e.g., a torque-based table for determining branch pressure in an offgoing clutch, modeled clutch pressure, etc. The controller 50 executes any process instructions embodying the present method 100 from a tangible, non-transitory computer-readable medium, e.g., tangible memory storage portions of the memory 54. Execution of such instructions causes the controller 50 to limit branch pressure (arrow $P_B$) in a branch of the fluid circuit 12, e.g., branch 44, as explained below.

In the vehicle embodiment of FIG. 1, the branches 44 and 45 are in fluid communication with the device 51 in the form of a dual-clutch transmission (DCT), hereinafter referred to as the DCT 51 for clarity. However, the present approach may be used for a single input clutch transmission, or with any system 10 having a PVFS valve 25 and/or 125 feeding a QVFS valve 27 and/or 127, with the QFVS valve(s) feeding a potentially pressure-sensitive component such as a clutch pack.

As is well understood in the art, one input clutch of a typical DCT, e.g., the clutch 21, selects and controls oddly-numbered transmission gears, for instance first, third, fifth, and seventh gears, while another input clutch, for instance the clutch 121, selects and controls the evenly-numbered gears, e.g., second, fourth, sixth, and reverse gears. The DCT 51 may be powered by an internal combustion engine 11 or other torque generator via an input member 13. The DCT 51 ultimately transmits output torque (arrow 53) to a set of drive wheels (not shown) to power the vehicle.

Each input clutch 21, 121 of the DCT 51 may be selectively actuated via a respective piston assembly 32, 132. Thus, the embodiment of FIG. 1 uses a series of valves to pressurize and fill the clutches of the DCT 51 via separate branches 44, 45, with the VFS valve 25 controlling fill pressure to branch 44 and the substantially identical VFS valve 125 controlling fill pressure to branch 45. Another valve 27, 127 may be positioned downstream of the VFS valves 44 and 45, respectively, e.g., fill solenoids that may or may not be of the VFS type.

The fluid circuit 12 may optionally include a bypass valve 48 and a check valve 14 for a hydraulic accumulator 40, as well as another check valve 15 providing pressure relief. Other valves may be used to provide the required level of fluid control in the fluid circuit 12. The pump 26 draws oil 31 or another suitable fluid from a sump 28 and circulates the oil 31 through the conduit 30 at line pressure, which may be measured via a sensor 41 and communicated to a controller 50. Fluid pressure acting in branch 44 is indicated in FIG. 1 by arrow $P_B$. For consistency, branch 44 will be used hereinafter to illustrate the present approach. However the same approach may be used in branch 45 or any other branch of the fluid circuit 12.

As noted above, the controller 50 selectively limits branch pressure (arrow $P_B$), which may help to protect certain hardware of the clutch 21 during a shift event and/or to optimize shift feel in the event that the QVFS fails to its maximum aperture position. The controller 50 receives, records, and/or stores prerecorded control information (arrow 23) from the fluid circuit 12, including the measured line pressure from sensor 41, fluid temperature from sensor 16, specifications of the VFS valve 25 such as aperture size range and pressure response, etc. The controller 50 then calculates a pressure command (arrow 36) which limits the branch pressure (arrow $P_B$) based on a "worst-case" aperture area required by the QVFS valve 27 in conducting the shift.

Figure 2:
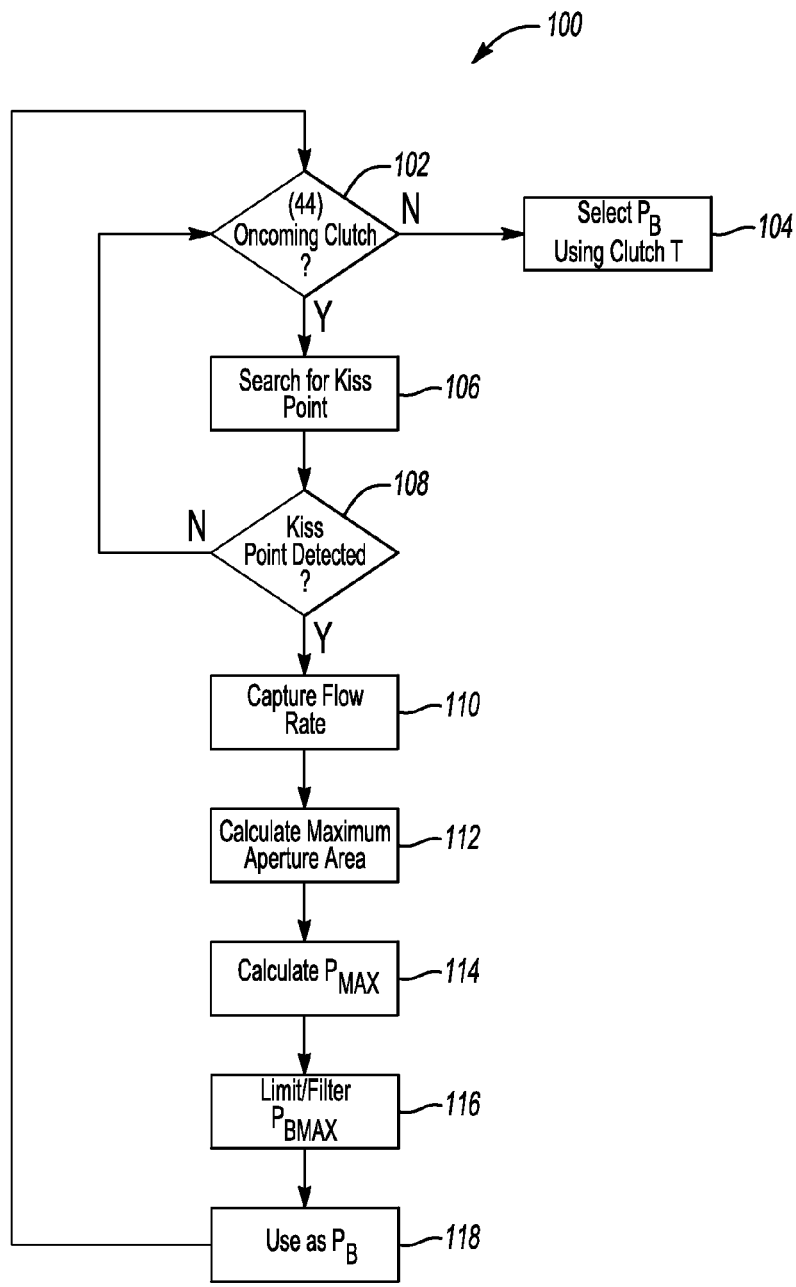
FIG. 2 is a flow chart describing an example method for limiting branch pressure to the QVFS valve of FIG. 1.

Referring to FIG. 2, an example embodiment of method 100 is disclosed for an illustrative transmission shift event. Clutch shifts are particularly prone to disturbances which may affect the feel of the shift. While not usually harmful to the clutch hardware, a poor shift feel may adversely affect the driving experience at a subjective level. However, depending on the current shift phase, sudden high branch pressure may damage clutch actuators and possibly the driveshaft. Therefore, control of the fill of a clutch in a vehicle transmission is an example of the type of application in which use of the present method 100 may have particular utility.

Method 100 commences with step 102, wherein the controller 50 determines if a branch to be controlled, e.g., branch 44 in keeping with the above example, is feeding an oncoming clutch in a shift event. If so, the method 100 proceeds to step 106. If the branch in consideration feeds the offgoing clutch, the method 100 proceeds instead to step 104.

At step 104, the controller 50 may select branch pressure (arrow $P_B$) based on required clutch torque. For instance, the controller 50 may access a calibrated lookup table indexed by required clutch torque, or calculate this value as a function of transmission input speed, output speed, requested engine speed, etc. The method 100 is finished with this step, resuming with step 102 with the next shift event.

At step 106, the controller 50 searches for a spike in a commanded flow rate to branch 44 which indicates the start of a commanded shift, i.e., the "kiss point" at which the oncoming clutch makes contact, and then proceeds to step 108.

At step 108, the controller 50 determines whether the spike has been detected in the search conducted at step 106. If so, the method 100 proceeds to step 110. Otherwise, the method 100 repeats step 102.

At step 110, the controller 50 captures the current flow rate in memory 54. Once recorded, the method 100 proceeds to step 112.

At step 112, the controller 50 calculates the maximum orifice or aperture area of the QVFS valve 27. For instance, the controller 50 may solve the following equation:

$$Q = K_{OIL} * A_{VFS} * \sqrt{P_B - P_{MOD}}$$

where the flow rate at the start of the shift (Q), the calibrated constant ($K_{OIL}$) and modeled clutch pressure ($P_{MOD}$) are extracted from a lookup table 60 or otherwise recorded in memory 54, and branch pressure (arrow $P_B$) is estimated from the initial commanded pressure to the PVFS 25. The constant $K_{OIL}$ is a function of the temperature of the oil 31. The area of the orifice within the QVFS valve 27, i.e., $A_{VFS}$, is then solved for and recorded in memory 54. This area is the "worst case" aperture size for the upcoming shift. The method 100 then proceeds to step 114.

Beginning at step 114, the controller 50 calculates the maximum branch pressure ($P_{BMAX}$) in a calibrated loop during the rest of the shift assuming the QVFS 27 is stuck at the worst case aperture size, i.e., area ($A_{VFS}$) from step 112. The area ($A_{VFS}$) remains frozen at the calculated worst case maximum value obtained via the calculation at step 112. For instance, the controller 50 may solve for $P_{BMAX}$ in the following equations:

$$P_{BMAX} = [Q/(K_{OIL} * A_{VFS})]^2 + P_{MOD}$$

Here, Q is the actual flow at a particular moment in the shift, i.e., a calibrated value which decreases as the shift progresses toward completion. $P_{MOD}$ continues to be extracted from a lookup table, and $P_{BMAX}$ is calculated for each loop or control cycle, e.g., once every 12.5 ms. The calculated value ($P_{BMAX}$) is recorded in memory 54, and the method 100 proceeds to step 116.

At step 116, the controller 50 may rate limit and/or filter the value ($P_{BMAX}$) calculated at step 114 so as to reduce the effects of transient or abrupt changes in value. Step 116 may include using, e.g., a Kalman filter, a lag filter, weighted average, and/or a rolling average of values so that the effects of outliers or extreme values are reduced.

At step 118, the controller 50 uses the filtered value from step 116 as the commanded branch pressure (arrow $P_B$ of FIG. 1). Thus, in the event the QVFS valve 27 should fail open, branch pressure (arrow $P_B$) is dynamically limited so as to minimize the effects of the failure on clutch performance. Branch pressure (arrow $P_B$) is limited by commanding the calculated $P_{BMAX}$ to the PVFS 25, e.g., as a current command for the PVFS.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a transmission having a clutch;
   a pump in fluid communication with the clutch through a branch of a fluid circuit;
   a flow control variable force solenoid (QFVS) positioned in the branch;
   a pressure control variable force solenoid (PVFS) valve positioned in the branch upstream of the QVFS, wherein the PVFS valve supplies oil from the pump to the QVFS valve; and
   a controller in electrical communication with the clutch, the pump, the PVFS valve;
   wherein the controller:
      calculates an area of a variable orifice of the QVFS valve at the start of a clutch shift event;
      records the calculated area as a maximum area;
      calculates, in a calibrated loop during the shift event, a maximum allowable branch pressure in the branch as a function of the calculated maximum area; and
      limits actual branch pressure in the branch during the shift event to the calculated maximum allowable branch pressure.

2. The vehicle of claim 1, wherein the transmission is a dual-clutch transmission (DCT) and the clutch is one of a pair of input clutches to the DCT.

3. The vehicle of claim 1, wherein the controller calculates the maximum area of the orifice as a function of a commanded branch pressure.

4. The vehicle of claim 1, further comprising a temperature sensor positioned in the fluid circuit in electrical communication with the controller, wherein the temperature sensor measures a temperature of the oil, and wherein the controller calculates the maximum area of the orifice as a function of the measured oil temperature.

5. The vehicle of claim 4, further comprising a lookup table containing a modeled clutch pressure, wherein the controller extracts the modeled clutch pressure from the lookup table and calculates the maximum area of the orifice as a function of the modeled clutch pressure.

6. The vehicle of claim 1, wherein the clutch is an oncoming clutch, further comprising an offgoing clutch in another branch of the fluid circuit, wherein the controller limits pressure to the offgoing clutch by selecting a pressure value from a clutch torque-based lookup table.

7. The vehicle of claim 1, wherein the controller filters the maximum branch pressure using one of a Kalman filter, a weighted average, a rolling average, and a lag filter.

8. A control system for a transmission having a clutch, a pump in fluid communication with the clutch through a branch of a fluid circuit, a pressure control variable force solenoid (PVFS), and a flow control variable force solenoid (QVFS) valve, wherein the PVFS and QVFS valves are positioned in the branch upstream of the clutch, the system comprising:
   a host machine in electrical communication with the clutch, the pump, and the PVFS and QVFS valves;
   a temperature sensor positioned in the fluid circuit in electrical communication with the host machine, wherein the temperature sensor measures a temperature of the oil; and
   a tangible, non-transitory computer-readable medium on which is recorded instructions for limiting branch pressure, wherein the host machine executes the instructions from the computer-readable medium to thereby:
      calculate an area of a variable orifice of the QVFS valve at the start of a clutch shift event as a function of a commanded branch pressure and a measured oil temperature;
      record the calculated area as a maximum area;
      calculate, in a calibrated loop during the shift event, a maximum branch pressure in the branch as a function of the calculated maximum area; and
      limit actual branch pressure in the branch during the shift event to the calculated maximum branch pressure.

9. The control system of claim 8, wherein the controller is configured to limit the branch pressure by transmitting a current command to the PVFS valve.

10. The control system of claim 8, further comprising a lookup table containing a modeled clutch pressure, wherein the host machine extracts the modeled clutch pressure from the lookup table and calculates the maximum area of the orifice as a function of the modeled clutch pressure.

11. The control system of claim 8, wherein the host machine is configured to filter the maximum branch pressure using one of a Kalman filter, a weighted average, a rolling average, and a lag filter.

12. A method comprising:
   calculating an area of a variable orifice of a flow control variable force solenoid (QVFS) valve at the start of a clutch shift event in a vehicle, wherein the vehicle includes a pump that is in fluid communication with a clutch through a pressure control variable force solenoid (PVFS) valve and the QVFS valve in a branch of a fluid circuit;

recording the calculated area as a maximum area;

calculating, in a calibrated loop during the shift event, a maximum branch pressure in the branch as a function of the calculated maximum area; and limiting, via a controller, fluid pressure in the branch during the shift event to the calculated maximum branch pressure.

13. The method of claim 12, further comprising:
measuring a temperature of the oil; and
calculating the maximum area of the orifice as a function of the oil temperature.

14. The method of claim 12, further comprising:
extracting a modeled clutch pressure from a lookup table using the controller; and
calculating the maximum area of the orifice as a function of the modeled clutch pressure.

15. The method of claim 12, wherein the clutch is an oncoming clutch in the shift event, further comprising:
limiting pressure to an off-going clutch to a pressure value selected from a clutch torque-based lookup table.

16. The method of claim 12, further comprising filtering the calculated maximum branch pressure using one of a Kalman filter, a weighted average, a rolling average, and a lag filter.

\* \* \* \* \*